United States Patent
Zhang

(10) Patent No.: US 9,917,884 B2
(45) Date of Patent: Mar. 13, 2018

(54) FILE TRANSMISSION METHOD, APPARATUS, AND DISTRIBUTED CLUSTER FILE SYSTEM

(71) Applicant: TENCENT TECHNOLOGY (SHENZHEN) COMPANY LIMITED, Shenzhen (CN)

(72) Inventor: Lei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 140 days.

(21) Appl. No.: 15/105,657

(22) PCT Filed: Feb. 13, 2015

(86) PCT No.: PCT/CN2015/072980
§ 371 (c)(1),
(2) Date: Jun. 17, 2016

(87) PCT Pub. No.: WO2015/090245
PCT Pub. Date: Jun. 25, 2015

(65) Prior Publication Data
US 2018/0027048 A1    Jan. 25, 2018

(30) Foreign Application Priority Data
Dec. 17, 2013  (CN) .......................... 2013 1 0695160

(51) Int. Cl.
*G06F 11/00* (2006.01)
*H04L 29/08* (2006.01)
*G06F 17/30* (2006.01)
*H04L 12/26* (2006.01)

(52) U.S. Cl.
CPC ........ *H04L 67/06* (2013.01); *G06F 17/30197* (2013.01); *H04L 43/10* (2013.01); *H04L 67/1097* (2013.01); *H04L 67/26* (2013.01)

(58) Field of Classification Search
CPC ..... H04L 67/06; H04L 67/1097; H04L 67/26; H04L 43/10; H04L 12/1859; G06F 17/30197
See application file for complete search history.

(56) References Cited

U.S. PATENT DOCUMENTS 6,185,623 B1 *  2/2001  Bailey ................... H04L 12/185
                                                  709/220
8,401,016 B2 *  3/2013  Li ........................... H04L 45/00
                                                  370/389

(Continued)

FOREIGN PATENT DOCUMENTS

CN          1777110 A   *  5/2006
CN        101355490 A   *  1/2009  ............. H04L 45/00

(Continued)

OTHER PUBLICATIONS

International Preliminary Report on Patentability (English translation), International Application No. PCT/CN2015/072980 dated Jun. 21, 2016.

(Continued)

*Primary Examiner* — Bryce P Bonzo
*Assistant Examiner* — Anthony J Amoroso
(74) *Attorney, Agent, or Firm* — Marshall, Gerstein & Borun LLP

(57) ABSTRACT

A file transmission method includes: obtaining file information of a to-be-transmitted file from a distributed coordination node cluster; determining that at least one slave push node stores the to-be-transmitted file according to the file information of the to-be-transmitted file and heartbeat information of the at least one slave push node; wherein the heartbeat information of the at least one slave push node contains file information stored in the at least one slave push node, and the to-be-transmitted file is retrieved by the at least one slave push node from a file storage node cluster;

(Continued)

generating a file transmission path, wherein the file transmission path comprises at least one destination node cluster; sending the file transmission path to the at least one slave push node, so that the at least one slave push node sends the to-be-transmitted file to the at least one destination node cluster through the file transmission path.

19 Claims, 6 Drawing Sheets

(56) References Cited

U.S. PATENT DOCUMENTS

| | | | | |
|---|---|---|---|---|
| 2012/0311099 | A1* | 12/2012 | Yoshida | G06F 17/30209 709/219 |
| 2014/0066063 | A1* | 3/2014 | Park | H04L 67/26 455/435.1 |

FOREIGN PATENT DOCUMENTS

| | | |
|---|---|---|
| CN | 101902388 A | 12/2010 |
| CN | 102394922 A | 3/2012 |
| CN | 103414761 A | 11/2013 |
| KR | 20130133989 A * | 12/2013 |

OTHER PUBLICATIONS

Office Action (with concise explanation of relevance in English), Chinese patent application No. 201310695160.8, dated Feb. 17, 2015.

Written Opinion (English translation), International Application No. PCT/CN2015/072980 dated Apr. 29, 2015.

Search Report in International Application No. PCT/CN2015/072980 dated Apr. 29, 2015, 4 pages.

* cited by examiner

FILE TRANSMISSION METHOD, APPARATUS, AND DISTRIBUTED CLUSTER FILE SYSTEM

CROSS-REFERENCE TO RELATED APPLICATIONS

This application is a national phase application of PCT/CN2015/072980 filed on Feb. 13, 2015, which claims benefit of and priority to Chinese Patent Application No. 201310695160.8 filed on Dec. 17, 2013 entitled "FILE TRANSMISSION METHOD, APPARATUS, AND DISTRIBUTED CLUSTER FILE SYSTEM". The entire disclosures of each of the above applications are incorporated herein by reference.

TECHNICAL FIELD

The present disclosure relates to information technologies, and more particularly to a file transmission method, apparatus, and distributed cluster file system.

BACKGROUND OF THE INVENTION

With the increasing of data, a file system has been gradually developed into a distributed cluster file system. The distributed clustered file system may include a database, an interface machine, a scheduling machine and multiple destination nodes. The database may record and display file information, the interface machine may store to-be-issued mission data such as files, the scheduling machine may schedule and manage missions in the distributed cluster file system, and the destination nodes may store files.

One of important functions of the distributed cluster file system is to quickly transmit a file to a destination node.

When the distributed clustered file system is to transmit a file, the scheduling machine checks whether the database stores file information of the to-be-transmitted file. When determining that the database stores the file information of the to-be-transmitted file, the scheduling machine schedules file transmission between the interface machine and multiple destination nodes according to the file information of the to-be-transmitted the file.

In a conventional transmission procedure, multiple destination nodes request the interface machine for files. However, since there may be only one or a few interface machines, the load capacity of the interface machines is limited. When transmitting files to multiple destination nodes, the load of the interface machines is very heavy, and thus it is easy to become an input/output (I/O) bottleneck of disks. Accordingly, not only other programs running on the current machine but also the transmission of the distributed cluster file system will be influenced. Also, if the stability of the database maintaining the file information of the to-be-transmitted file is poor, when a host where the database is located fails, the scheduling machine will be unable to schedule file transmission, thereby making the entire system broken.

SUMMARY OF THE INVENTION

Embodiments of the present disclosure provide a file transmission method, apparatus, and a distributed cluster file system. The technical solutions are implemented as follows.

A distributed cluster file system provided according to an embodiment of the present disclosure may include:

a distributed coordination node cluster, comprising a plurality of coordination nodes which share information among them, and to generate file information of a to-be-transmitted file;

a file storage node cluster, comprising a plurality of storage nodes, and to store the to-be-transmitted file;

a push node cluster, comprising a master push node and at least one slave push node, wherein the master push node is to determine that at least one slave push node stores the to-be-transmitted file according to the file information of the to-be-transmitted file and heartbeat information of the at least one slave push node; the heartbeat information of the at least one slave push node contains file information stored in the at least one slave push node, and the to-be-transmitted file is retrieved by the at least one slave push node from the storage node cluster;

wherein the master push node is further to generate a file transmission path, and the file transmission path comprises at least one destination node cluster;

the master push node is further to send the file transmission path to the at least one slave push node, so that the at least one slave push node sends the to-be-transmitted file to the at least one destination node cluster according to the file transmission path; and each of the at least one destination node cluster comprises a plurality of destination nodes.

A file transmission method provided according to another embodiment of the present disclosure may include:

obtaining, by a master push node, file information of a to-be-transmitted file from a distributed coordination node cluster;

determining, by the master push node, that at least one slave push node stores the to-be-transmitted file according to the file information of the to-be-transmitted file and heartbeat information of the at least one slave push node; wherein the heartbeat information of the at least one slave push node contains file information stored in the at least one slave push node, and the to-be-transmitted file is retrieved by the at least one slave push node from a file storage node cluster;

generating, by the master push node, a file transmission path, wherein the file transmission path comprises at least one destination node cluster;

sending, by the master push node, the file transmission path to the at least one slave push node, so that the at least one slave push node sends the to-be-transmitted file to the at least one destination node cluster through the file transmission path; and wherein each of the at least one destination node cluster comprises a plurality of destination nodes.

A file transmission method provided according to another embodiment of the present disclosure may include:

receiving, by a destination node, a data packet of a to-be-transmitted file and a file transmission path;

storing, by the destination node, the data packet of a to-be-transmitted file into a memory; and sending, by the destination node, the data packet of the to-be-transmitted file to a next destination node according to the file transmission path.

A file transmission apparatus provided according to another embodiment of the present disclosure may include:

a file information obtaining module, to obtain file information of a to-be-transmitted file from a distributed coordination node cluster;

a to-be-transmitted file determining module, to determine that at least one slave push node stores the to-be-transmitted file according to the file information of the to-be-transmitted file generated by the distributed coordination node cluster and heartbeat information of the at least one slave push node, wherein the heartbeat information of the at least one slave push node contains file information stored in the at least one slave push node, and the to-be-transmitted file is retrieved by the at least one slave push node from the file storage node cluster;

a path generating module, to generate a file transmission path, wherein the file transmission path comprises at least one destination node cluster; and a path sending module, to send the file transmission path to the at least one slave push node, so that the at least one slave push node sends the to-be-transmitted file to the at least one destination node cluster through the file transmission path, wherein each of the at least one destination node cluster comprises a plurality of destination nodes.

A file transmission apparatus provided according to another embodiment of the present disclosure may include:

a receiving module, to receive a data packet of a to-be-transmitted file and a file transmission path;

a storing module, to store the data packet of the to-be-transmitted file into a memory; and a sending module, to send the data packet of the to-be-transmitted file to a next destination node according to the file transmission path.

In the embodiments of the present disclosure, the distributed coordination node cluster maintains the file information of the to-be-transmitted file, and the push node cluster generates the file transmission path and performs the transmission process according to the file information of the to-be-transmitted file. The master push node may generate the file transmission path, and a plurality of slave push nodes may obtain the to-be-transmitted file from the file storage node cluster, and transmit the file to multiple destination node clusters through respective paths. By the embodiments of the present disclosure, when multiple nodes simultaneously access a single node to perform file transmission, a single-point bottleneck phenomenon can be avoided. Moreover, even if a node in the distributed coordination node cluster fails, the normal operation of the file system will not be influenced.

BRIEF DESCRIPTION OF THE DRAWINGS

In order to describe the technical solutions provided by the embodiments of the present disclosure clearly, the accompanying drawings referred to in the embodiments will be illustrated briefly hereinafter. Obviously, these accompanying drawings are some examples of the present disclosure, and according to these accompanying drawings, those skilled in the art can obtain other accompanying drawings without creative labor.

DETAILED EMBODIMENTS OF THE INVENTION

In order to make the technical solutions and advantages of the present disclosure clearer, embodiments of the present disclosure will be described in detail hereinafter with reference to the accompanying drawings.

Figure 1:
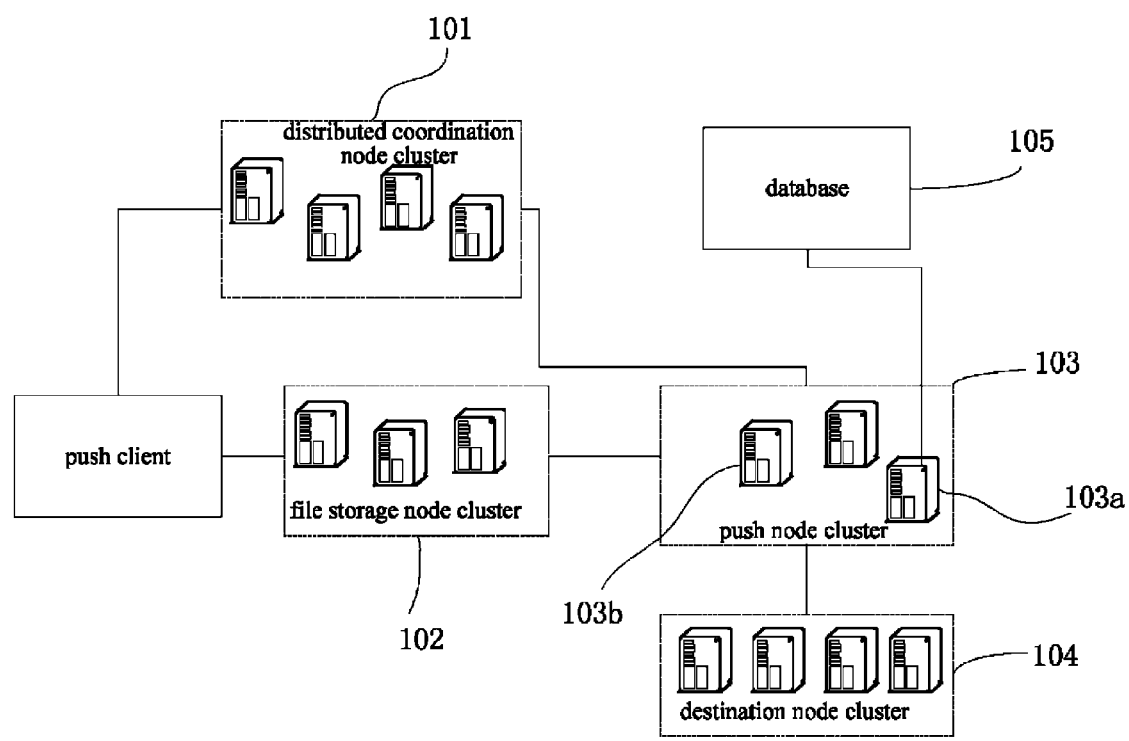
FIG. 1 is a diagram illustrating the structure of a distributed cluster file system according to an embodiment of the present disclosure.

FIG. 1 is a diagram illustrating the structure of a distributed cluster file system according to an embodiment of the present disclosure. Referring to FIG. 1, the system includes a distributed coordination node cluster 101, a file storage node cluster 102, a push node cluster 103 and at least one destination node cluster 104.

The distributed coordination node cluster 101 includes a plurality of coordination nodes which share information among them. The distributed coordination node cluster 101 may generate file information of a to-be-transmitted file.

The file storage node cluster 102 includes a plurality of storage nodes, and may store the to-be-transmitted file.

The push node cluster 103 includes a master push node 103a and at least one slave push node 103b. The master push node 103a determines whether the at least one slave push node 103b stores the to-be-transmitted file according to the file information of the to-be-transmitted file and the heartbeat information of the at least one slave push node 103b. The heartbeat information of the at least one slave push node 103b contains file information stored in the at least one slave push node 103b, and the to-be-transmitted file may be retrieved by the at least one slave push node 103b from the storage node cluster 102 storing the to-be-transmitted file.

The master push node 103a may also generate a file transmission path, and the file transmission path includes at least one destination node cluster 104.

The master push node 103a may also send the file transmission path to the at least one slave push node 103b, so that the at least one slave push node 103b may send the to-be-transmitted file to the at least one destination node cluster 104 according to the file transmission path.

Each of the at least one destination node cluster 104 may include a plurality of destination nodes.

Furthermore, the system may also include a database 105. The database 105 may display status information of the to-be-transmitted file, such as a progress status, etc.

The master push node 103a may determine a current file transmission path through one or any combination of the following ways.

In an embodiment of the present disclosure, the master push node 103a may obtain the generated file transmission path. When the generated file transmission path includes a first destination node cluster, the master push node 103a deletes the first destination node cluster from the generated file transmission path, and uses the file transmission path from which the first destination node cluster has been deleted as the current file transmission path. The first destination node cluster is a destination node cluster from which the master push node 103a has not received its heartbeat information within a preset period of time.

In another embodiment of the present disclosure, the master push node 103a may obtain the generated file transmission path. When the generated file transmission path includes a second destination node cluster, the master push node 103a deletes the second destination node cluster from the generated file transmission path, and uses the file transmission path from which the second destination node cluster has been deleted as the current file transmission path. The second destination node cluster is a destination node cluster on which a transmission mission is being executed.

In another embodiment of the present disclosure, the master push node 103a may obtain the current file transmission path according to the heartbeat information of a destination node. The file transmission path includes a third destination node cluster and the third destination node cluster is a destination node cluster which is in an idle state.

In another embodiment of the present disclosure, the master push node 103a may obtain the current file transmission path according to a data request for the to-be-transmitted file. At least one destination node cluster in the file transmission path is a destination node cluster sending the data request.

In an embodiment of the present disclosure, the heartbeat information of the at least one slave push node 103b also contains the status information of the at least one slave push node.

The master push node 103a may determine a slave push node which is in an idle state from the at least one slave push node 103b according to the status information of the at least one slave push node 103b.

The master push node 103a sends the file transmission path to the slave push node which is in an idle state.

In an embodiment of the present disclosure, the master push node 103a is elected from a plurality of push nodes according to temporary node serial numbers, and the temporary node serial numbers are assigned by the distributed coordination system.

In an embodiment of the present disclosure, the at least one slave push node 103b may check the file information of the to-be-transmitted file that has been generated by the distributed coordination node cluster 101. When determining that the slave push node does not have the to-be-transmitted file according to the file information of the to-be-transmitted file, the slave push node obtains the to-be-transmitted file from the file storage node cluster 102.

In an embodiment of the present disclosure, the system may also include a database 105.

The master push node 103a may also receive the progress information of the file transmission sent by a plurality of destination nodes in the file transmission path, and writes the progress information of the file transmission into the database 105.

In an embodiment of the present disclosure, when receiving a packet of the to-be-transmitted file, the destination node may transmit the received packet to a next destination node in the file transmission path.

In another embodiment of the present disclosure, when receiving a packet of the to-be-transmitted file, the destination node may transmit the received packet to any one of other destination nodes which belong to the same destination node cluster as the destination node.

Figure 2:
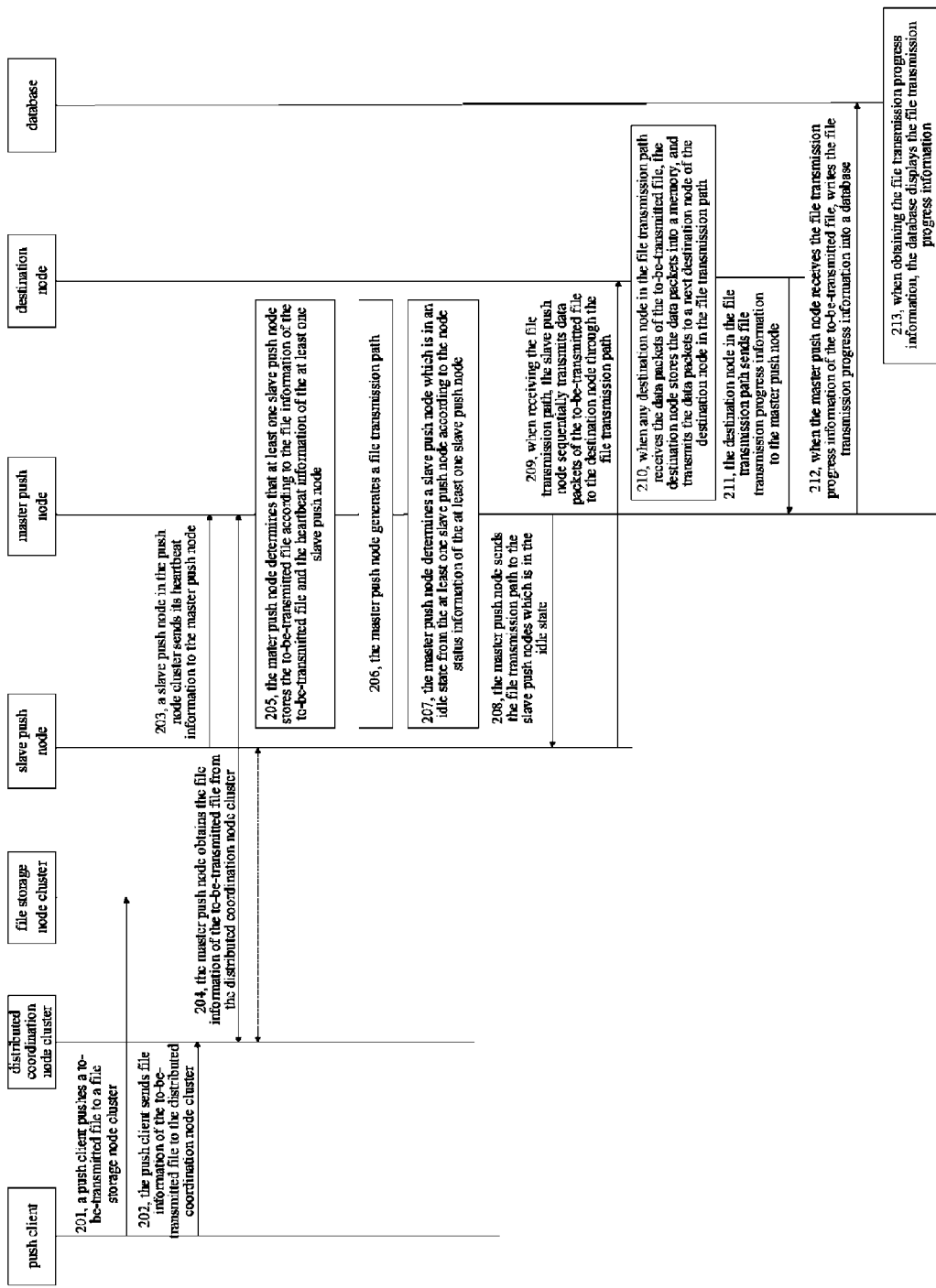
FIG. 2 is a flowchart illustrating a file transmission method according to an embodiment of the present disclosure.

A file transmission method provided according to an embodiment of the present disclosure will be described in detail with reference to the system architecture shown in FIG. 1. Referring to FIG. 2, the file transmission method may include following blocks.

In block 201, a push client pushes a to-be-transmitted file to a file storage node cluster.

In an embodiment of block 201, when obtaining a file, the push client may push the file to the file storage node cluster as required for storage. In this case, the push client determines the file as the to-be-transmitted file, and pushes the to-be-transmitted file to the file storage node cluster for storage. For the file storage node cluster such as a Hadoop File System (HDFS), the to-be-transmitted file may be stored in the HDFS.

In block 202, the push client sends file information of the to-be-transmitted file to the distributed coordination node cluster.

In order to clearly learn which files are stored in the file storage node cluster, the push client may send file information of files to the distributed coordinator node cluster when sending the files to the file storage node cluster. Block 202 may be implemented as follows. The push client sends to the distributed coordination node cluster a storage address of the to-be-transmitted file in the file storage node cluster, the size of the to-be-transmitted file, an identity of the to-be-transmitted file and the time of receiving the to-be-transmitted file. The distributed coordination node cluster generates the file information of the to-be-transmitted file after receiving the above information.

In block 203, a slave push node in the push node cluster sends its heartbeat information to the master push node.

The heartbeat information of the slave push node may include stored file information, node status information and so on. The node status information may include finished missions of the slave push node, executing missions of the slave push node, failed missions of the slave push node and information about whether the slave push node is in an idle state.

Since the number of push nodes may be large and the push nodes are generally used to push files to the destination node, a master push node may be elected from the push node cluster to avoid conflict between the push nodes. The master push node may collect heartbeat information of each slave push node to learn the file information stored in each slave push node and a current node status of each slave push node. The master push node may also obtain heartbeat information of each destination node cluster or each destination node, to learn a node status of each destination node cluster. Further, in order to make the data in the file system consistent, the master push node may also schedule and manage the file transmission in the file system.

The process for electing a master push node from the push node cluster may be implemented as follows. The distributed coordination system assigns a temporary node serial number for each push node in the push node cluster, and a plurality of push nodes participate in an election according to the temporary node serial numbers to determine the master push node.

The distributed coordination node cluster may assign a unique temporary node serial number for the plurality of push nodes. When the plurality of push nodes start, each of the plurality of push nodes registers in the distributed coordinator node cluster, so that each of the plurality of push nodes may act as a temporary node and may be assigned a temporary node serial number by the distributed coordination node cluster. When any one of the plurality of push nodes obtains its temporary node serial number, the push node compares its temporary node serial number with the temporary node serial numbers of other push nodes to determine whether the temporary node serial number of the push node is the smallest. When determining that the temporary node serial number of the push node is smallest, the push node may be determined as the master push node.

Figure 3:
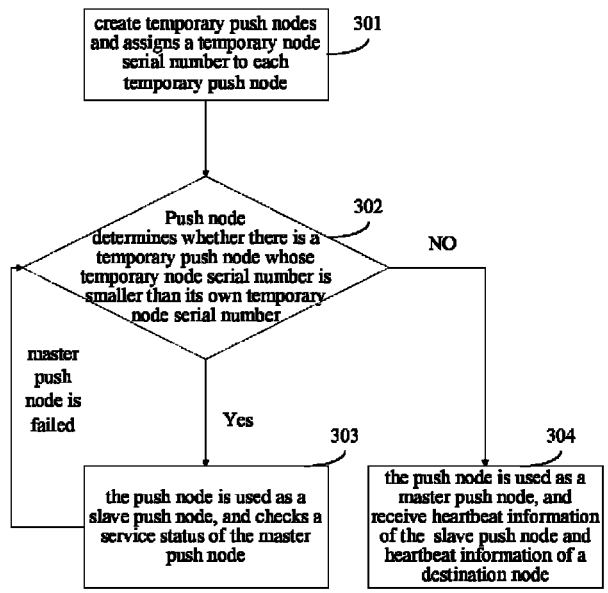
FIG. 3 is a flowchart illustrating a method for electing a master push node according to an embodiment of the present disclosure.

FIG. 3 is a flowchart of a method illustrating a method for electing a master push node according to an embodiment of the present disclosure. Referring to FIG. 3, the method may include following blocks.

In block 301, the distributed coordination node cluster takes each of the plurality of push nodes as a temporary push node and assigns a temporary node serial number to the temporary push node.

In block 302, any one of the plurality of push nodes determines whether there is a temporary push node whose temporary node serial number is smaller than its own temporary node serial number. When determining that there is a temporary push node whose temporary node serial number is smaller than its own temporary node serial number, block 303 is performed; otherwise, block 304 is performed.

In block 303, the push node is used as a slave push node, and checks a service status of the push node whose temporary node serial number is smaller than its own temporary node serial number. If the service status of the checked push node is a failure status, block 302 is performed.

In block 304, the push node is used as a master push node.

In block 204, the master push node obtains the file information of the to-be-transmitted file from the distributed coordination node cluster.

Specifically, the master push node determines whether the distributed coordination node cluster contains the file information of the to-be-transmitted file by checking the file information stored in the distributed coordination node cluster. When determining that the distributed coordination node cluster contains the file information of the to-be-transmitted file, the master push node obtains the file information of the to-be-transmitted file.

The file information of the to-be-transmitted file may include: the storage address of the to-be-transmitted file in the file storage node cluster, the size of the to-be-transmitted file, an identity of the to-be-transmitted file, the time of receiving the to-be-transmitted file, etc. The identity of the to-be-transmitted file may be the name of the to-be-transmitted file, or a HASH value of the to-be-transmitted file, such as a message digest algorithm 5 (MD5) value, or a key value given to the to-be-transmitted file by a user. Methods for identifying the to-be-transmitted file are not limited in the embodiments of the present disclosure.

The master push node may also obtain the file information of the to-be-transmitted file from the distributed coordination node cluster when a destination node requests the master push node for the to-be-transmitted file. The master push node obtains the file information stored in the distributed coordination node cluster according to the identity of the to-be-transmitted file contained in the request sent by the destination node. When the file information stored in the distributed coordination node cluster contains file information corresponding to the identity of the to-be-transmitted file, the master push node obtains the file information of the to-be-transmitted file from the distributed coordination node cluster.

In block 205, the mater push node determines that at least one slave push node stores the to-be-transmitted file according to the file information of the to-be-transmitted file and the heartbeat information of the at least one slave push node. The heartbeat information of the at least one slave push node contains the file information stored in the at least one slave push node, and the to-be-transmitted file is retrieved from the file storage node cluster by the at least one slave push node.

For a slave push node, the master push node determines, according to the file information of the to-be-transmitted file, whether the heartbeat information uploaded by the slave push node contains the file information of the to-be-transmitted file. When determining that the heartbeat information uploaded by the slave push node contains the file information of the to-be-transmitted file, the master push node determines that the to-be-transmitted file is stored in the slave push node.

For example, assume that the identity of the to-be-transmitted file is a MD5 value. The master push node compares the MD5 value in the obtained file information of the to-be-transmitted file with a MD5 value contained in the stored file information sent by the slave push node, to determine whether the file information stored in the slave push node contains the MD5 value of the to-be-transmitted file. When determining that the stored file information sent by the slave push node contains the MD5 value of the to-be-transmitted file, the master push node determines that the slave push node stores the to-be-transmitted file.

It should be noted that, the slave push node also checks the distributed coordinator node cluster node to learn whether there is new file information of the to-be-transmitted file. When determining that there is new file information of the to-be-transmitted file on the distributed coordinator node cluster according to the file information in the slave push node and the file information in the distributed coordinator node cluster, the slave push node obtains the to-be-transmitted file from the file storage node cluster according to the file information of the to-be-transmitted file.

In block 206, the master push node generates a file transmission path.

Specifically, the master push node may obtain the file transmission path through following processes.

At process (I), the master push node obtains the generated file transmission path. When the generated file transmission path includes a first destination node cluster, the master push node deletes the first destination node cluster from the generated file transmission path and uses the file transmission path from which the first destination node cluster has been deleted as the current file transmission path. The first destination node cluster is a destination node cluster from which the master push node has not received its heartbeat information within a preset period of time.

In order to increase the speed of file transmission, the master push node may directly transmit the to-be-transmitted file through the generated file transmission path. Specifically, the master push node obtains the generated file transmission path, and determines, according to the heartbeat information sent by each destination node cluster in the file transmission path within the preset period of time, whether it has received the heartbeat information of all destination node clusters in the file transmission path within the preset period of time. If the heartbeat information of all destination node clusters in the file transmission path has been received within the preset period of time, the master push node uses the file transmission path as the current file transmission path. If the heartbeat information of a destination node cluster in the file transmission path has not been received within the preset period of time, the master push node deletes the destination node cluster from the generated file transmission path, and uses the file transmission path from which the destination node cluster has been deleted as the current file transmission path.

At process (II), the master push node obtains the generated file transmission path. When the generated file transmission path includes a second destination node cluster, the master push node deletes the second destination node cluster from the generated file transmission path and uses the file transmission path from which the second destination node cluster has been deleted as the current file transmission path. The second destination node cluster is a destination node cluster on which a transmission mission is being executed.

Since the generated file transmission path may include a destination node cluster on which a transmission mission is being executed, the master push node may delete the destination node cluster on which the transmission mission is being executed from the generated file transmission path to avoid repeated transmission or unsuccessful transmission, etc.

At process (III), the master push node obtains the current file transmission path according to the heartbeat information of a destination node. The file transmission path includes a third destination node cluster, and the third destination node cluster is a destination node cluster which is in an idle state.

Specifically, the master push node determines the destination node cluster which is in an idle state according to node status information in the received heartbeat information of the destination node cluster, and generates the file transmission path according to the destination node cluster which is in an idle state.

At process (IV), the master push node obtains the current file transmission path according to a data request for the to-be-transmitted file. At least one destination node cluster in the file transmission path includes a destination node cluster sending the data request.

Specifically, when any one destination node in the destination node clusters requests the master push node for the to-be-transmitted file, the master push node may generate a file transmission path including the destination node cluster according to the destination node cluster requesting for the to-be-transmitted file.

It should be noted that the above methods for generating the file transmission path may be combined. For example, for a file transmission path, if at least two of the above four processes occurs, a destination node or a destination node cluster may be deleted or added according to an actual situation, thereby performing file transmission flexibly.

In the embodiments of the present disclosure, suppose each of the at least one slave push node includes the to-be-transmitted file. In an actual scenario, there may be only one or more slave push nodes which have stored the to-be-transmitted file. In this case, a file transmission path is generated only for the slave push nodes which have stored the to-be-transmitted file. Since the physical addresses of the slave push nodes are different, beginnings of file transmission paths of different slave push nodes are different. In order to avoid transmission conflict among a plurality of slave push nodes and improve transmission efficiency, different file transmission paths may be generated for different slave push nodes. That is, different slave push nodes may send the to-be-transmitted file to different destination node clusters.

In block 207, the master push node determines a slave push node which is in an idle state from the at least one slave push node according to the node status information of the at least one slave push node.

Specifically, each slave push node sends the node status information to the master push node at an interval of the preset period of time. When receiving the node status information, the master push node determines, according to the above node status information, whether the slave push node is in an idle state.

When a slave push node is executing a file transmission mission, and if the slave push node is stilled used as a push device, the file transmission speed may influenced. In this case, the to-be-transmitted file needs to queue at this slave push node before it is transmitted. Therefore, in order to save time and improve transmission efficiency, the master push node may determine the slave push node which is in the idle state according to the node status information.

In block 208, the master push node sends the file transmission path to the slave push nodes which is in the idle state.

In the embodiments of the present disclosure, there is one-to-one correspondence between the file transmission path and the slave push nodes.

In block 209, when receiving the file transmission path, the slave push node sequentially transmits data packets of the to-be-transmitted file to the destination node through the file transmission path.

During a transmission process, the slave push node splits the to-be-transmitted file into multiple data packets, and sequentially transmits the data packets of the to-be-transmitted file to the first destination node in the file transmission path through the file transmission path.

In block 210, when any destination node in the file transmission path receives the data packets of the to-be-transmitted file, the destination node stores the data packets into a memory, and transmits the data packets to a next destination node of the destination node in the file transmission path.

Specifically, when the slave push node transmits the data packets of the to-be-transmitted file to the first destination node in the file transmission path, the first destination node stores the data packets into its memory, and transmits the data packets to the second destination node in the file transmission path. The second destination node receives the data packets, stores the data packets and sends the data packets to the third destination node. This process continues until a destination node receives the data packets and determines that it is the last node in file transmission path. Through the above process, when the slave push node sends the data packets, all destination nodes in the file transmission path transmit the data packets almost at the same time. Thus, the slave push node and each destination node both have a very low load, thereby occupying little system resources, and not affecting applications running on these nodes. Furthermore, the data transmission will be completed within a preset short period of time, for example, a milliseconds period of time.

Figure 4:
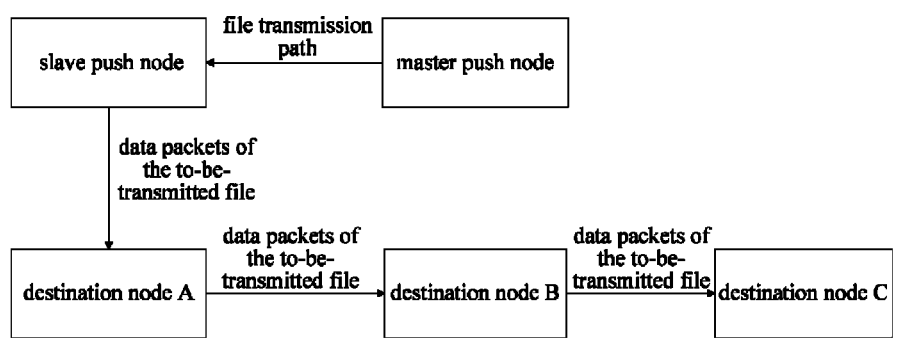
FIG. 4 is a diagram illustrating a file transmission process according to an embodiment of the present disclosure.

In order to make the transmission process of the to-be-transmitted file clearer, FIG. 4 shows a diagram illustrating a file transmission process according to an embodiment of the present disclosure. Referring to FIG. 4, the master push node sends the file transmission path to any one of the slave push nodes which store the to-be-transmitted file and are in the idle state. The slave push node sends the data packets of the to-be-transmitted file to a destination node A in the destination node cluster according to the file transmission path. When receiving the data packets, the destination node A stores the data packets into its memory, and sends the data packets to a next destination node B of the destination node A in the file transmission path. The destination node B stores the data packets into its memory and sends the data packets to the last destination node C in the file transmission path.

As such, the to-be-transmitted file will be stored in each destination node in the file transmission path.

It should be noted that, in the distributed file transmission system deployed according to the above embodiments, the push node cluster and the destination node cluster are deployed in the same computer room. Each destination node cluster includes ten destination nodes. Each push node takes a destination node cluster as one unit to issue a mission. That is, the file transmission path of each push node includes one destination node cluster. In this case, if a file of 200 MB is to be transmitted, just 20 seconds are needed from the beginning of issuing a mission by a push client to the ending of transmitting the file to the destination node cluster.

In block 211, the destination node in the file transmission path sends file transmission progress information to the master push node.

In order to determine whether the file transmission is successful and which destination nodes have successfully received the to-be-transmitted file, the destination node needs to return the file transmission progress information to the master push node. Specifically, when the preset period of time expires, the destination node sends the transmission progress information of the data packets of the to-be-transmitted file to the master push node, so that the master push node may determine the file transmission progress of the to-be-transmitted file.

In block 212, when the master push node receives the file transmission progress information of the to-be-transmitted file, writes the file transmission progress information into a database.

In block 213, when obtaining the file transmission progress information, the database displays the file transmission progress information.

It should be noted that, the master push node may also write the heartbeat information of the slave push nodes and the heartbeat information of the destination nodes into the database. When obtaining the heartbeat information of the slave push nodes and the heartbeat information of the destination nodes, the database displays the heartbeat information of the slave push nodes and the heartbeat information of the destination nodes. In this case, the database may display to the user the file information stored in the slave push nodes, the service statuses of the slave push nodes, the file information received by the destination nodes, file information of a file which has not been received successfully and mission information of a mission that is being executed.

In the method provided according to the embodiments of the present disclosure, the distributed coordination node cluster maintains the file information of the to-be-transmitted file, and the push node cluster generates the file transmission path and performs the transmission process according to the file information of the to-be-transmitted file. The master push node may generate the file transmission path, and a plurality of slave push nodes may obtain the to-be-transmitted file from the file storage node cluster, and transmit the file to multiple destination node clusters through respective paths. By the method provided according to embodiments of the present disclosure, when multiple nodes simultaneously access a single node to perform file transmission, a single-point bottleneck phenomenon can be avoided. Moreover, even if a node in the distributed coordination node cluster fails, the normal operation of the file system will not be influenced. Since a chain-transmission is performed between the destination nodes, the slave push node and each destination node both have a very low load, thereby occupying little system resources, and not affecting applications running on these nodes. Furthermore, the data transmission will be completed within a short period of time, for example, a milliseconds period of time.

Figure 5:
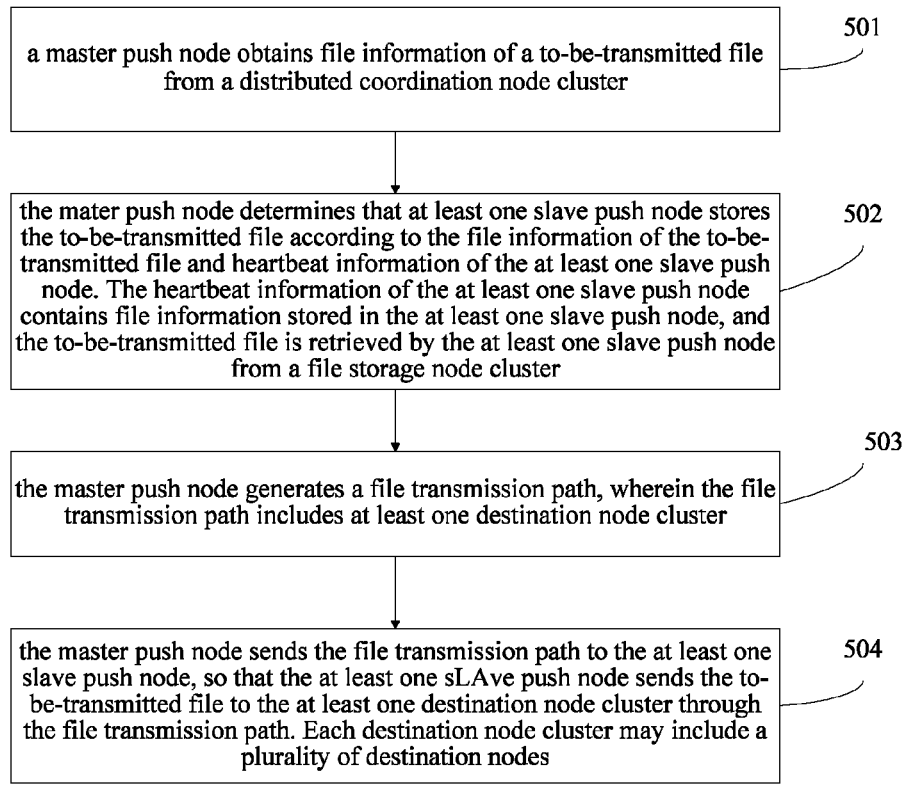
FIG. 5 is a flowchart illustrating a file transmission method according to another embodiment of the present disclosure.

FIG. 5 is a flowchart illustrating a file transmission method according to another embodiment of the present disclosure. The file transmission method may include following blocks.

In block 501, a master push node obtains file information of a to-be-transmitted file from a distributed coordination node cluster.

In block 502, the mater push node determines that at least one slave push node stores the to-be-transmitted file according to the file information of the to-be-transmitted file and heartbeat information of the at least one slave push node. The heartbeat information of the at least one slave push node contains file information stored in the at least one slave push node, and the to-be-transmitted file is retrieved by the at least one slave push node from a file storage node cluster.

In block 503, the master push node generates a file transmission path, wherein the file transmission path includes at least one destination node cluster.

In block 504, the master push node sends the file transmission path to the at least one slave push node, so that the at least one slave push node sends the to-be-transmitted file to the at least one destination node cluster through the file transmission path. Each destination node cluster may include a plurality of destination nodes.

In the method provided according to the embodiments of the present disclosure, the distributed coordination node cluster maintains the file information of the to-be-transmitted file, and the push node cluster generates the file transmission path and performs the transmission process according to the file information of the to-be-transmitted file. The master push node may generate the file transmission path, and a plurality of slave push nodes may obtain the to-be-transmitted file from the file storage node cluster, and transmit the file to multiple destination node clusters through respective paths. By the method provided according to embodiments of the present disclosure, when multiple nodes simultaneously access a single node to perform file transmission, a single-point bottleneck phenomenon can be avoided. Moreover, even if a node in the distributed coordination node cluster fails, the normal operation of the file system will not be influenced.

In the embodiments of the present disclosure, the master push node may generate the file transmission path through one or any combination of the following ways.

In an embodiment of the present disclosure, the master push node may obtain the generated file transmission path. When the generated file transmission path includes a first destination node cluster, the master push node deletes the first destination node cluster from the generated file transmission path, and uses the file transmission path from which the first destination node cluster has been deleted as the current file transmission path. The first destination node cluster is a destination node cluster from which the master push node has not received its heartbeat information within a preset period of time.

In another embodiment of the present disclosure, the master push node may obtain the generated file transmission path. When the generated file transmission path includes a second destination node cluster, the master push node deletes the second destination node cluster from the generated file transmission path, and uses the file transmission path from which the second destination node cluster has been deleted as the current file transmission path. The second destination node cluster is a destination node cluster on which a transmission mission is being executed.

In another embodiment of the present disclosure, the master push node may obtain the current file transmission path according to the heartbeat information of a destination node. The file transmission path includes a third destination node cluster and the third destination node cluster is a destination node cluster which is in an idle state.

In another embodiment of the present disclosure, the master push node may obtain the current file transmission path according to a data request for the to-be-transmitted file. At least one destination node cluster in the file transmission path is a destination node cluster sending the data request.

In an embodiment of the present disclosure, the heartbeat information of the at least one slave push node also contains the status information of the at least one slave push node. A method for sending the file transmission path to the at least one slave push node by the master push node may include following processes.

The master push node may determine a slave push node which is in an idle state from the at least one slave push node according to the status information of the at least one slave push node.

The master push node sends the file transmission path to the slave push node which is in an idle state.

In an embodiment of the present disclosure, the master push node is elected from a plurality of push nodes according to temporary node serial numbers, and the temporary node serial numbers are assigned by the distributed coordination system.

In an embodiment of the present disclosure, the slave push node retrieves the to-be-transmitted file from the file storage node cluster when determining that it does not store the to-be-transmitted file.

In an embodiment of the present disclosure, after the master push node sends the file transmission path to the at least one slave push node, the method may also include a process of:

receiving, by the master push node, file transmission progress information sent by a plurality of destination nodes in the file transmission path, and writing the file transmission progress information into a database.

Figure 6:
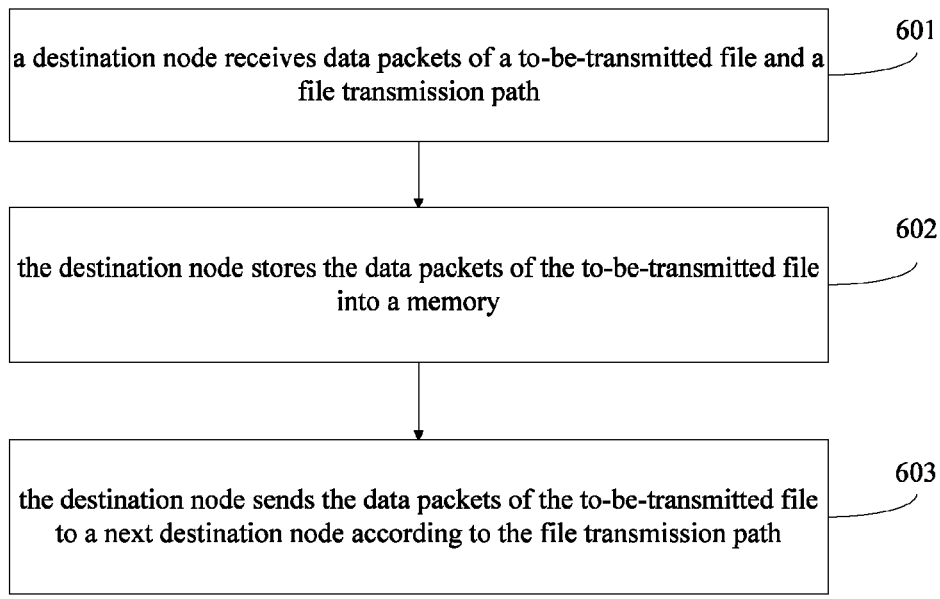
FIG. 6 is a flowchart illustrating a file transmission method according to another embodiment of the present disclosure.

FIG. 6 is a flowchart illustrating a file transmission method according to another embodiment of the present disclosure. The file transmission method may include following blocks.

In block 601, a destination node receives data packets of a to-be-transmitted file and a file transmission path.

In block 602, the destination node stores the data packets of the to-be-transmitted file into a memory.

In block 603, the destination node sends the data packets of the to-be-transmitted file to a next destination node according to the file transmission path.

In the method provided according to the embodiments of the present disclosure, the destination node receives and stores the data packets of the to-be-transmitted file, and sends the data packets of the to-be-transmitted file to another destination node according to the file transmission path. When the slave push node sends the data packets, all destination nodes in the file transmission path transmit the data packets almost at the same time. Thus, the slave push node and each destination node both have a very low load, thereby occupying little system resources, and not affecting applications running on these nodes. Accordingly, data transmission speed may be greatly improved.

Figure 7:
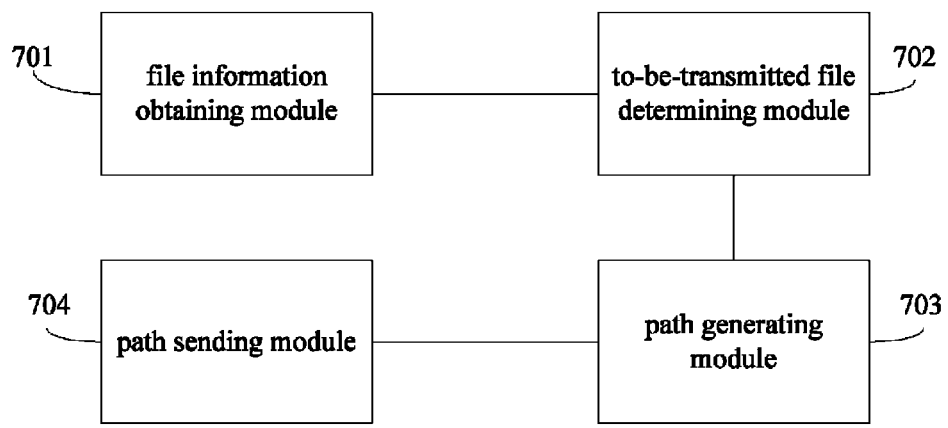
FIG. 7 is a diagram illustrating the structure of a file transmission apparatus according to an embodiment of the present disclosure.

FIG. 7 is a diagram illustrating the structure of a file transmission apparatus according to an embodiment of the present disclosure. Referring to FIG. 7, the apparatus includes a file information obtaining module 701, a to-be-transmitted file determining module 702, a path generating module 703 and a path sending module 704. The file information obtaining module 701 may obtain file information of a to-be-transmitted files from a distributed coordination node cluster, and is connected to the to-be-transmitted file determining module 702. The to-be-transmitted file determining module 702 may determine that at least one slave push node stores the to-be-transmitted file according to the file information of the to-be-transmitted file generated by the distributed coordination node cluster and the heartbeat information of the at least one slave push node. The heartbeat information of the at least one slave push node contains file information stored in the at least one slave push node, and the to-be-transmitted file is retrieved by the at least one slave push node from a file storage node cluster. The to-be-transmitted file determining module 702 is connected to the path generating module 703. The path generating module 703 may generate a file transmission path. The file transmission path includes at least one destination node cluster. The path generating module 703 is connected to the path sending module 704. The path sending module 704 may send the file transmission path to the at least one slave push node, so that the at least one slave push node sends the to-be-transmitted file to the at least one destination node cluster through the file transmission path. Each destination node cluster may include a plurality of destination nodes.

In an embodiment of the present disclosure, the path generating module 703 obtains the generated file transmission path, and when the generated file transmission path includes a first destination node cluster, deletes the first destination node cluster from the generated file transmission path, and uses the file transmission path from which the first destination node cluster has been deleted as a current file transmission path. The first destination node cluster is a destination node cluster from which a master push node has not received its heartbeat information within a preset period of time.

In another embodiment of the present disclosure, the path generating module 703 may obtain the generated file transmission path, and when the generated file transmission path includes a second destination node cluster, deletes the second destination node cluster from the generated file transmission path, and uses the file transmission path from which the second destination node cluster has been deleted as a current file transmission path. The second destination node cluster is a destination node cluster on which a transmission mission is being executed.

In another embodiment of the present disclosure, the path generating module 703 obtains the current file transmission path according to the heartbeat information of a destination node. The file transmission path includes a third destination node cluster and the third destination node cluster is a destination node cluster which is in an idle state.

In another embodiment of the present disclosure, the path generating module 703 obtains the current file transmission path according to a data request for the to-be-transmitted file. At least one destination node cluster in the file transmission path is a destination node cluster sending the data request.

In an embodiment of the present disclosure, when the heartbeat information of the at least one slave push node also contains the status information of the at least one slave push node, the path sending module 704 may determine a slave push node which is in an idle state from the at least one slave push node according to the status information of the at least one slave push node; and send the file transmission path to the slave push node which is in the idle state.

In an embodiment of the present disclosure, the master push node is elected from a plurality of push nodes according to temporary node serial numbers. The temporary node serial numbers are assigned by the distributed coordination system.

In an embodiment of the present disclosure, the slave push node retrieves the to-be-transmitted file from the file storage node cluster when determining that it does not store the to-be-transmitted file.

In an embodiment of the present disclosure, the apparatus may further include:

a writing module, to receive file transmission progress information sent by a plurality of destination nodes and write the file transmission progress information into a database.

According to the apparatus provided by the embodiments of the present disclosure, the distributed coordination node cluster maintains the file information of the to-be-transmitted file, and the push node cluster generates the file transmission path and performs the transmission process according to the file information of the to-be-transmitted file. The master push node may generate the file transmission path, and a plurality of slave push nodes may obtain the to-be-transmitted file from the file storage node cluster, and transmit the file to multiple destination node clusters through respective paths. By the apparatus provided by the embodiments of the present disclosure, when multiple nodes simultaneously access a single node to perform file transmission, a single-point bottleneck phenomenon can be avoided. Moreover, even if a node in the distributed coordination node cluster fails, the normal operation of the file system will not be influenced.

Figure 8:
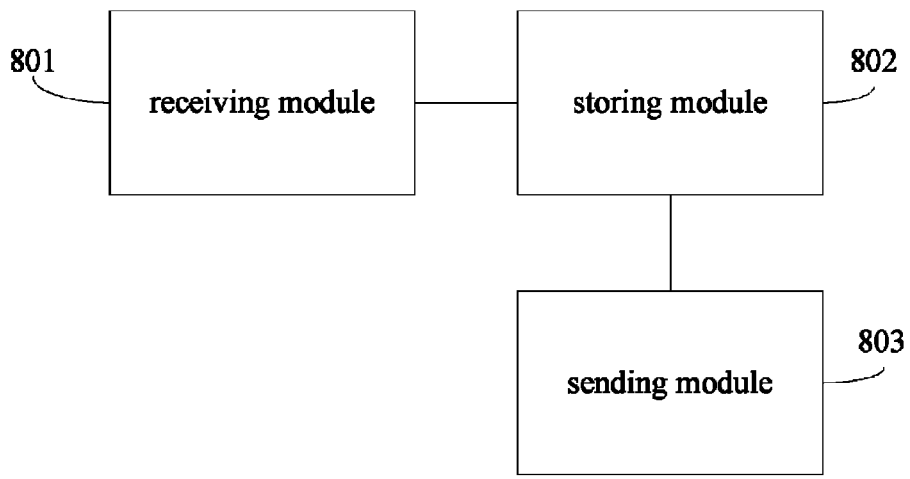
FIG. 8 is a diagram illustrating the structure of a file transmission apparatus according to another embodiment of the present disclosure.

FIG. 8 is a diagram illustrating the structure of a file transmission apparatus according to another embodiment of the present disclosure. Referring to FIG. 8, the apparatus includes a receiving module 801, a storing module 802 and a sending module 803. The receiving module 801 may receive data packets of a to-be-transmitted file and a file transmission path and is connected with the storing module 802. The storing module 802 may store the data packets of the to-be-transmitted file in a memory and is connected with the sending module 803. The sending module 803 sends the data packets of the to-be-transmitted file to a next destination node according to the file transmission path.

According to the apparatus provided according to the embodiments of the present disclosure, the apparatus receives and stores the data packets of the to-be-transmitted file, and sends the data packets of the to-be-transmitted file to another destination node according to the file transmission path. When the slave push node sends the data packets, all destination nodes in the file transmission path transmit the data packets almost at the same time. Thus, the slave push node and each destination node both have a very low load, thereby occupying little system resources, and not affecting applications running on these nodes. Accordingly, data transmission speed may be greatly improved.

Figure 9:
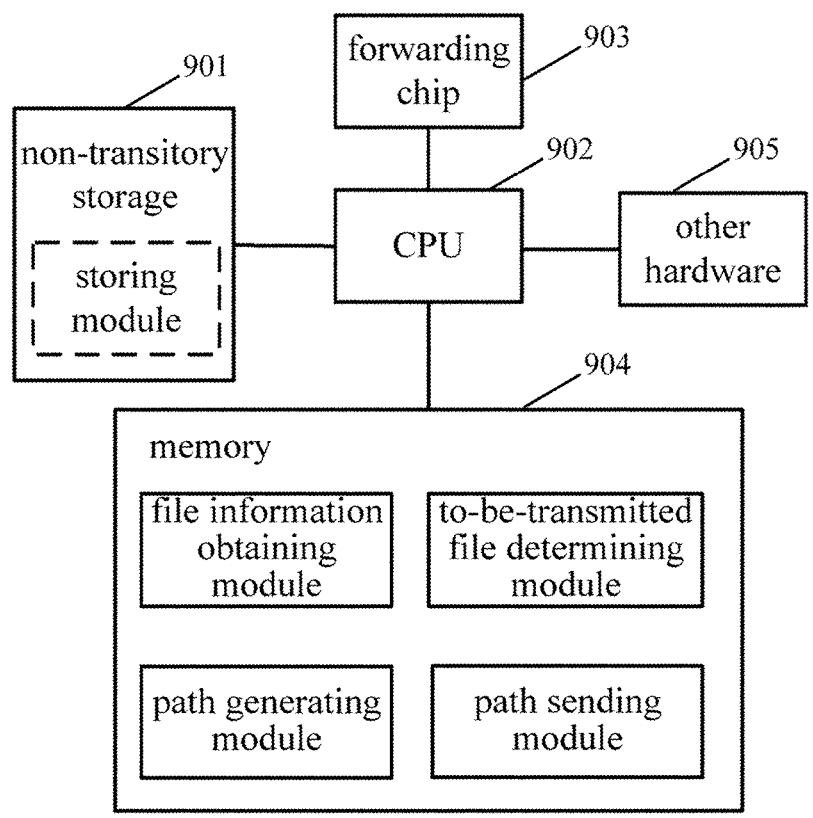
FIG. 9 is a diagram illustrating the structure of a file transmission apparatus according to another embodiment of the present disclosure.

FIG. 9 is a diagram illustrating the structure of a file transmission apparatus according to another embodiment of the present disclosure. Referring to FIG. 9, the apparatus includes a non-transitory storage 901, a CPU (central processing unit) 902, a forwarding chip 903, a memory 904 and other hardware 905.

The memory 904 may store instruction codes. The instruction codes are executed to implement the functions of the file information obtaining module, the to-be-transmitted file determining module, the path generating module and the path sending module of the apparatus shown in FIG. 7.

The CPU 902 may communicate with the forwarding chip 903 to send and receive various data packets, communicate with the memory 904 to read and execute the instruction codes stored in the memory 904 to implement the functions of the file information obtaining module, the to-be-transmitted file determining module, the path generating module and the path sending module of the above apparatus, process the data packets sent from the forwarding chip 903, communicate with the non-transitory storage 901 to read data from and write data into the non-transitory storage 901. The data includes file information of the to-be-transmitted file and heartbeat information of at least one push node.

The file information obtaining module may obtain the file information of the to-be-transmitted file from a distributed coordination node cluster.

The to-be-transmitted file determining module may determine that at least one slave push node stores the to-be-transmitted file according to file information generated by the distributed coordination node cluster and heartbeat information of the at least one slave push node. The heartbeat information contains file information stored in the at least one slave push node, and the to-be-transmitted file is retrieved by the at least one slave push node from a file storage node cluster.

The path generating module may generate a file transmission path, wherein the file transmission path includes at least one destination node cluster.

The path sending module may send the file transmission path to the at least one slave push node, so that the at least one slave push node sends the to-be-transmitted file to at least one destination node cluster through the file transmission path. Each destination node cluster may include a plurality of destination nodes.

The forwarding chip 903 is connected to other nodes via its ports and performs receiving and sending processing for the above various data packets.

The non-transitory storage 901 may store various data including the file information of the to-be-transmitted file and the heartbeat information of the at least one push node to function as the storing module in the above apparatus.

The file transmission apparatus provided by the above embodiments has been described according to the above mentioned modules. In an actual application, the functions of the above mentioned modules may be implemented by different modules. That is, the modules of the file transmission apparatus may be different from the above mentioned modules, thereby implementing part or all of the above functions. In addition, the file transmission apparatus and the file transmission method belong to the same solution, referring to the above method embodiments, and will not be described herein.

Those skilled in the art can understand that all or part of processes in the embodiments of the present disclosure can be implemented by hardware, or by instructing related hardware by a program. The program may be stored in a computer readable storage medium, and the storage medium includes a ROM, a disk, a Compact Disc (CD) and so on.

The foregoing is only embodiments of the present disclosure and is not intended to limit the present disclosure. Any modification, equivalent substitution and improvement made within the spirit and principles of the present disclosure should be included in the protection scope of the present disclosure.

What is claimed is:

1. A distributed cluster file system, comprising:
a distributed coordination node cluster, comprising a plurality of coordination nodes which share information among them, and to generate file information of a to-be-transmitted file;
a file storage node cluster, comprising a plurality of storage nodes, and to store the to-be-transmitted file;
a push node cluster, comprising a master push node and at least one slave push node, wherein the master push node is to determine that at least one slave push node stores the to-be-transmitted file according to the file information of the to-be-transmitted file and heartbeat information of the at least one slave push node; the heartbeat information of the at least one slave push node contains file information stored in the at least one slave push node, and the to-be-transmitted file is retrieved by the at least one slave push node from the storage node cluster;
wherein the master push node is further to generate a file transmission path, and the file transmission path comprises at least one destination node cluster;
the master push node is further to send the file transmission path to the at least one slave push node, so that the at least one slave push node sends the to-be-transmitted file to the at least one destination node cluster according to the file transmission path; and
each of the at least one destination node cluster comprises a plurality of destination nodes.

2. The distributed cluster file system of claim 1, wherein the master push node is to perform one or any combination of processes of:
obtaining the generated file transmission path, and when the generated file transmission path comprises a first destination node cluster, deleting the first destination node cluster from the generated file transmission path, and using the file transmission path from which the first destination node cluster has been deleted as a current file transmission path, wherein the first destination node cluster is a destination node cluster from which the master push node has not received its heartbeat information within a preset period of time;
obtaining the generated file transmission path, and when the generated file transmission path comprises a second destination node cluster, deleting the second destination node cluster from the generated file transmission path and using the file transmission path from which the second destination node cluster has been deleted as the current file transmission path, wherein the second destination node cluster is a destination node cluster on which a transmission mission is being executed;
obtaining the current file transmission path according to heartbeat information of a destination node, wherein the file transmission path comprises a third destination node cluster, and the third destination node cluster is a destination node cluster which is in an idle state;
obtaining the current file transmission path according to a data request for the to-be-transmitted file, wherein at least one destination node cluster in the file transmission path comprises a destination node cluster sending the data request.

3. The distributed cluster file system of claim 1, wherein the heartbeat information of the at least one slave push node further contains status information of the at least one slave push node,
the master push node is to determine a slave push node which is in an idle state from the at least one slave push node according to the status information of the at least one slave push node; and
the master push node is to send the file transmission path to the slave push node which is in the idle state.

4. The distributed cluster file system of claim 1, wherein the master push node is elected from a plurality of push nodes according to temporary node serial numbers, wherein the temporary node serial numbers are assigned by a distributed coordination system.

5. The distributed cluster file system of claim 1, wherein the at least one slave push node is to check the file information of the to-be-transmitted file generated by the distributed coordination node cluster, and when determining that the at least one slave push node does not store the to-be-transmitted file according to the file information of the to-be-transmitted file, retrieve the to-be-transmitted file from the file storage node cluster.

6. The distributed cluster file system of claim 1, further comprising a database,
the master push node is further to obtain file transmission progress information sent by a plurality of destination nodes in the file transmission path, and write the file transmission progress information into the database.

7. The distributed cluster file system of claim 1, wherein a destination node is to, when receiving a data packet of the to-be-transmitted file, send the received data packet to a next destination node in the file transmission path; or
a destination node is to, when receiving a data packet of the to-be-transmitted file, send the received data packet to any one of other destination nodes which belong to the same destination node cluster as the destination node.

8. A file transmission method, comprising:
obtaining, by a master push node, file information of a to-be-transmitted file from a distributed coordination node cluster;
determining, by the master push node, that at least one slave push node stores the to-be-transmitted file according to the file information of the to-be-transmitted file and heartbeat information of the at least one slave push node; wherein the heartbeat information of the at least one slave push node contains file information stored in the at least one slave push node, and the to-be-transmitted file is retrieved by the at least one slave push node from a file storage node cluster;
generating, by the master push node, a file transmission path, wherein the file transmission path comprises at least one destination node cluster;
sending, by the master push node, the file transmission path to the at least one slave push node, so that the at least one slave push node sends the to-be-transmitted file to the at least one destination node cluster through the file transmission path; and
wherein each of the at least one destination node cluster comprises a plurality of destination nodes.

9. The file transmission method of claim 8, wherein generating, by the master push node, the file transmission path comprises one or any combination of processes of:
obtaining, by the master push node, the generated file transmission path, and when the generated file transmission path comprises a first destination node cluster, deleting the first destination node cluster from the generated file transmission path, and using the file transmission path from which the first destination node cluster has been deleted as a current file transmission path, wherein the first destination node cluster is a destination node cluster from which the master push node has not received its heartbeat information within a preset period of time;

obtaining, by the master push node, the generated file transmission path, and when the generated file transmission path comprises a second destination node cluster, deleting the second destination node cluster from the generated file transmission path, and using the file transmission path from which the second destination node cluster has been deleted as the current file transmission path, wherein the second destination node cluster is a destination node cluster on which a transmission mission is being executed;

obtaining, by the master push node, the current file transmission path according to heartbeat information of a destination node, wherein the file transmission path comprises a third destination node cluster, and the third destination node cluster is a destination node cluster which is in an idle state;

obtaining, by the master push node, the current file transmission path according to a data request for the to-be-transmitted file, wherein at least one destination node cluster in the file transmission path comprises a destination node cluster sending the data request.

10. The file transmission method of claim 8, wherein the heartbeat information of the at least one slave push node further contains status information of the at least one slave push node, and sending, by the master push node, the file transmission path to the at least one slave push node comprises:

determining, by the master push node, a slave push node which is in an idle state from the at least one slave push node according to the status information of the at least one slave push node; and sending, by the master push node, the file transmission path to the slave push node which is in the idle state.

11. The file transmission method of claim 8, wherein the master push node is elected from a plurality of push nodes according to temporary node serial numbers, wherein the temporary node serial numbers are assigned by a distributed coordination system.

12. The file transmission method of claim 8, wherein the to-be-transmitted file is retrieved by the at least one slave push node from the file storage node cluster when it is determined that the at least one slave push node does not store the to-be-transmitted file.

13. The file transmission method of claim 8, after the master push node sends the file transmission path to the at least one slave push node, further comprising:

receiving, by the master push node, file transmission progress information sent by a plurality of destination nodes in the file transmission path, and writing the file transmission progress information into a database.

14. A file transmission apparatus, comprising at least one hardware processor and at least one non-transitory storage, wherein the at least one non-transitory storage stores one or more computer-readable instructions, and the hardware processor executes the computer-readable instructions stored in the non-transitory storage to:

obtain file information of a to-be-transmitted file from a distributed coordination node cluster;

determine that at least one slave push node stores the to-be-transmitted file according to the file information of the to-be-transmitted file generated by the distributed coordination node cluster and heartbeat information of the at least one slave push node, wherein the heartbeat information of the at least one slave push node contains file information stored in the at least one slave push node, and the to-be-transmitted file is retrieved by the at least one slave push node from a file storage node cluster;

generate a file transmission path, wherein the file transmission path comprises at least one destination node cluster; and send the file transmission path to the at least one slave push node, so that the at least one slave push node sends the to-be-transmitted file to the at least one destination node cluster through the file transmission path, wherein each of the at least one destination node cluster comprises a plurality of destination nodes.

15. The file transmission apparatus of claim 14, wherein the hardware processor executes the computer-readable instructions stored in the non-transitory storage to perform one or any combination of processes of:

obtaining the generated file transmission path, and when the generated file transmission path comprises a first destination node cluster, deleting the first destination node cluster from the generated file transmission path, and using the file transmission path from which the first destination node cluster has been deleted as a current file transmission path, wherein the first destination node cluster is a destination node cluster from which the master push node has not received its heartbeat information within a preset period of time;

obtaining the generated file transmission path, and when the generated file transmission path comprises a second destination node cluster, deleting the second destination node cluster from the generated file transmission path, and using the file transmission path from which the second destination node cluster has been deleted as a current file transmission path, wherein the second destination node cluster is a destination node cluster on which a transmission mission is being executed;

obtaining a current file transmission path according to heartbeat information of a destination node, wherein the file transmission path comprises a third destination node cluster, and the third destination node cluster is a destination node cluster which is in an idle state;

obtaining the current file transmission path according to a data request for the to-be-transmitted file, wherein at least one destination node cluster in the file transmission path comprises a destination node cluster sending the data request.

16. The file transmission apparatus of claim 14, wherein the heartbeat information of the at least one slave push node contains status information of the at least one slave push node, and the hardware processor executes the computer-readable instructions stored in the non-transitory storage to determine a slave push node which is in an idle state from the at least one slave push node according to the status information of the at least one slave push node, and send the file transmission path to the slave push node which is in the idle state.

17. The file transmission apparatus of claim 14, wherein a master push node is elected from a plurality of push nodes according to temporary node serial numbers, wherein the temporary node serial numbers are assigned by a distributed coordination system.

18. The file transmission apparatus of claim 14, wherein the to-be-transmitted file is retrieved by the at least one slave push node from the file storage node cluster when it is determined that the at least one slave push node does not store the to-be-transmitted file.

19. The file transmission apparatus of claim 14, wherein the hardware processor executes the computer-readable instructions stored in the non-transitory storage to further receive file transmission progress information sent by a plurality of destination nodes in the file transmission path, and write the file transmission progress information into a database.

\* \* \* \* \*